(12) United States Patent
Huang et al.

(10) Patent No.: US 10,089,302 B2
(45) Date of Patent: *Oct. 2, 2018

(54) NATIVE-SCRIPT AND CROSS-SCRIPT CHINESE NAME MATCHING

(71) Applicant: International Business Machines Corporation, Armonk, NY (US)

(72) Inventors: Shudong Huang, Vienna, VA (US); Nien C. King, Vienna, VA (US)

(73) Assignee: International Business Machines Corporation, Armonk, NY (US)

( * ) Notice: Subject to any disclaimer, the term of this patent is extended or adjusted under 35 U.S.C. 154(b) by 286 days.

This patent is subject to a terminal disclaimer.

(21) Appl. No.: 13/777,608

(22) Filed: Feb. 26, 2013

(65) Prior Publication Data

US 2014/0244238 A1 Aug. 28, 2014

(51) Int. Cl.
*G06F 17/28* (2006.01)
*G06F 17/22* (2006.01)

(52) U.S. Cl.
CPC .......... *G06F 17/28* (2013.01); *G06F 17/2223* (2013.01)

(58) Field of Classification Search
CPC ................................ G06F 17/28; G06F 17/27
See application file for complete search history.

(56) References Cited

U.S. PATENT DOCUMENTS

| 5,659,731 A | 8/1997 | Gustafson |
| 2003/0229634 A1 | 12/2003 | Li |
| 2003/0229635 A1 | 12/2003 | Chaudhuri et al. |
| 2007/0005586 A1 | 1/2007 | Shaefer et al. |

(Continued)

FOREIGN PATENT DOCUMENTS

| CN | 1730279 A | 2/2006 |
| CN | 1755669 A | 4/2006 |

(Continued)

OTHER PUBLICATIONS

U.S. Appl. No. 13/776,797 Non-final Office Action. Notification dated Feb. 6, 2015.

(Continued)

*Primary Examiner* — Shreyans Patel
(74) *Attorney, Agent, or Firm* — Mollborn Patents, Inc.; Fredrik Mollborn

(57) ABSTRACT

Techniques for Chinese name matching are described. A Chinese name is received and is romanized into a Mandarin Pinyin representation. The Mandarin Pinyin representation of the Chinese name is matched against a set of Romanized Chinese names originating from several different Chinese character names. In response to finding a potential match between the Mandarin Pinyin representation and Romanized Chinese name, the original Chinese script for the Romanized Chinese name is retrieved. A native script comparison is applied between the received Chinese name and the original Chinese script for the Romanized Chinese name to obtain a match score. The native script comparison includes character-by-character comparison, character variant look-up, and/or consideration of name component misalignments. The obtained match score is used as a filter to reduce false positives that are generated in the matching of the Mandarin Pinyin representation against the set of Romanized Chinese names.

8 Claims, 3 Drawing Sheets

(56) References Cited

U.S. PATENT DOCUMENTS

| | | | |
|---|---|---|---|
| 2007/0021956 A1 | 1/2007 | Qu et al. | |
| 2007/0162445 A1* | 7/2007 | Scriffignano et al. | 707/6 |
| 2009/0319257 A1 | 12/2009 | Blume et al. | |
| 2011/0137636 A1* | 6/2011 | Srihari et al. | 704/2 |
| 2012/0016660 A1 | 1/2012 | Gillam et al. | |
| 2012/0016663 A1* | 1/2012 | Gillam et al. | 704/9 |
| 2012/0059646 A1 | 3/2012 | Georgiev et al. | |

FOREIGN PATENT DOCUMENTS

| | | | |
|---|---|---|---|
| CN | 101542475 A | 9/2009 | |
| CN | 102033879 A | 4/2011 | |
| CN | 102193646 A | 9/2011 | |

OTHER PUBLICATIONS

U.S. Appl. No. 14/490,529 Non-final Office Action. Notification dated Feb. 24, 2015.
USPTO Non-final Office Action. U.S. Appl. No. 14/491,210. Notification dated Apr. 16, 2015.
U.S. Appl. No. 13/776,797 Final Office Action. Notification dated May 22, 2015.
U.S. Appl. No. 14/490,259 Final Office Action. Notification dated May 29, 2015.
U.S. Appl. No. 13/776,797 Office Action. Notification dated Jan. 12, 2016.
U.S. Appl. No. 14/490,259 Final Office Action. Notification dated Dec. 31, 2015.
U.S. Appl. No. 13/776,797 Non-final Office Action. Notification dated Sep. 29, 2015.
U.S. Appl. No. 14/490,259 Non-final Office Action. Notification dated Sep. 25, 2015.
USPTO Final Office Action. U.S. Appl. No. 14/491,210. Notification dated Sep. 28, 2015.
USPTO Office Action. U.S. Appl. No. 14/491,210. Notification dated Oct. 19, 2016.
U.S. Appl. No. 13/776,797 Office Action. Notification dated Dec. 9, 2016.
U.S. Appl. No. 14/490,259 Office Action. Notification dated Dec. 12, 2016.
USPTO Office Action. U.S. Appl. No. 14/491,210. Notification dated May 11, 2017.
U.S. Appl. No. 14/490,259 Office Action. Notification dated May 4, 2017.
U.S. Appl. No. 13/776,797 Office Action. Notification dated Jun. 2, 2017.
USPTO Office Action. U.S. Appl. No. 14/491,210. Notification dated Oct. 3, 2017.
USPTO Office Action. U.S. Appl. No. 14/491,210. Notification dated Jan. 22, 2018.
USPTO Office Action. U.S. Appl. No. 14/491,210. Notification dated Apr. 27, 2016.
U.S. Appl. No. 14/490,259 Office Action. Notification dated Jun. 17, 2016.
The registry of standard Data, 2007URL: https://web.archive.org/web/20071231093412/http:/www.xml.gov.hk/en/approved/person_chinese_name_v1_0. him; Downloaded May 10, 2016. pp. 1-3.
U.S. Appl. No. 13/776,797 Office Action. Notification dated May 13, 2016.

* cited by examiner

NATIVE-SCRIPT AND CROSS-SCRIPT CHINESE NAME MATCHING

BACKGROUND

The present invention relates to name matching, and more specifically, to native-script and cross-script Chinese name matching. Chinese characters (known as Hanzi in Chinese, Kanji in Japanese, and Hanja in Korean) are used to represent names in several languages, each of which may use different characters for the same underlying name. Even within Chinese itself, there are regional variations. In mainland China and Singapore, for example, a simplified character set is used, while Taiwan and Hong Kong use traditional characters.

Before Unicode was widely adopted, different encoding systems were used for Chinese characters, and the range of characters supported by one encoding system was likely to be different from that of another encoding system. When an electronic text from one region was rendered into a version readable by people from another region, not only did the encoding system need to be converted, but region-specific characters also needed to be changed. For example, the name for the founding father of the People's Republic of China is represented as 毛泽东 in mainland China, as 毛澤東 in Taiwan, and as 毛沢東 in Japan.

The Unicode Consortium reserves a large range of code points to cover essentially all Chinese characters in use. There are many advantages to this, but it also creates some new challenges. One such challenge is that it is no longer obvious what regional variation is being used, since they can appear in the same text as long as there is proper font support. The variant names mentioned above, 毛泽东, 毛澤東, 毛沢東, and even 毛沢东 may all exist in a single database of personal names. Given any one variant as a query name, the name matching technology must be able to match all the other variants.

Existing name search systems do not have this capability. While the Google search engine, one of the most globally popular search engines, lets the user specify traditional and simplified Chinese as two different language options, it does not automatically convert a query in traditional Chinese characters to its simplified character equivalent or vice versa when specifying the return results in the other language option. Neither does the Baidu search engine, which is one of the most popular search engines in China, have this capability.

The problems described above are compounded by cross-script name matching. Various techniques have been proposed and implemented, particularly within cross-language information retrieval and machine translation, including transliteration, back transliteration, parallel name databases, and machine learning. However, such systems typically overlook that a name in one script may have more than one representation in another script, either because the source name has several readings (e.g. Japanese Kanji names) or the source language has more than one transliteration system in the target language (e.g. Pinyin, Wade-Giles and Yale for Romanizing Mandarin Chinese). Even when such transliteration standards exist, a person may choose a form that is different from any standard convention.

All Chinese characters in Mandarin Chinese are monosyllabic. There are only about 1,350 unique syllables in Chinese counting tones or 410 unique syllables when tone is not considered. With tens of thousands of Chinese characters, a single syllable can therefore be represented by dozens of different characters. As a result, names that may be written in an array of different Chinese characters may be transliterated into the same Romanized form. In other words, there is a many-to-one relationship between Hanzi names and their Romanized forms. Thus, it would be beneficial to have a Chinese name matching system capable of matching both Chinese character variants and Romanized variants while significantly reducing the number of false positives that are possible due to the many-to-one relationship between Chinese characters and their Romanized forms.

SUMMARY

According to one embodiment of the present invention, a technique for Chinese name matching is described. A Chinese name is received and is romanized into a Mandarin Pinyin representation. The Mandarin Pinyin representation of the Chinese name is matched against a set of Romanized Chinese names originating from several different Chinese character names. In response to finding a potential match between the Mandarin Pinyin representation and Romanized Chinese name, the original Chinese script for the Romanized Chinese name is retrieved. A native script comparison is applied between the received Chinese name and the original Chinese script for the Romanized Chinese name to obtain a match score. The native script comparison includes character-by-character comparison, character variant look-up, and/or consideration of name component misalignments. The obtained match score is used as a filter to reduce false positives that are generated in the matching of the Mandarin Pinyin representation against the set of Romanized Chinese names.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

Figure 1:
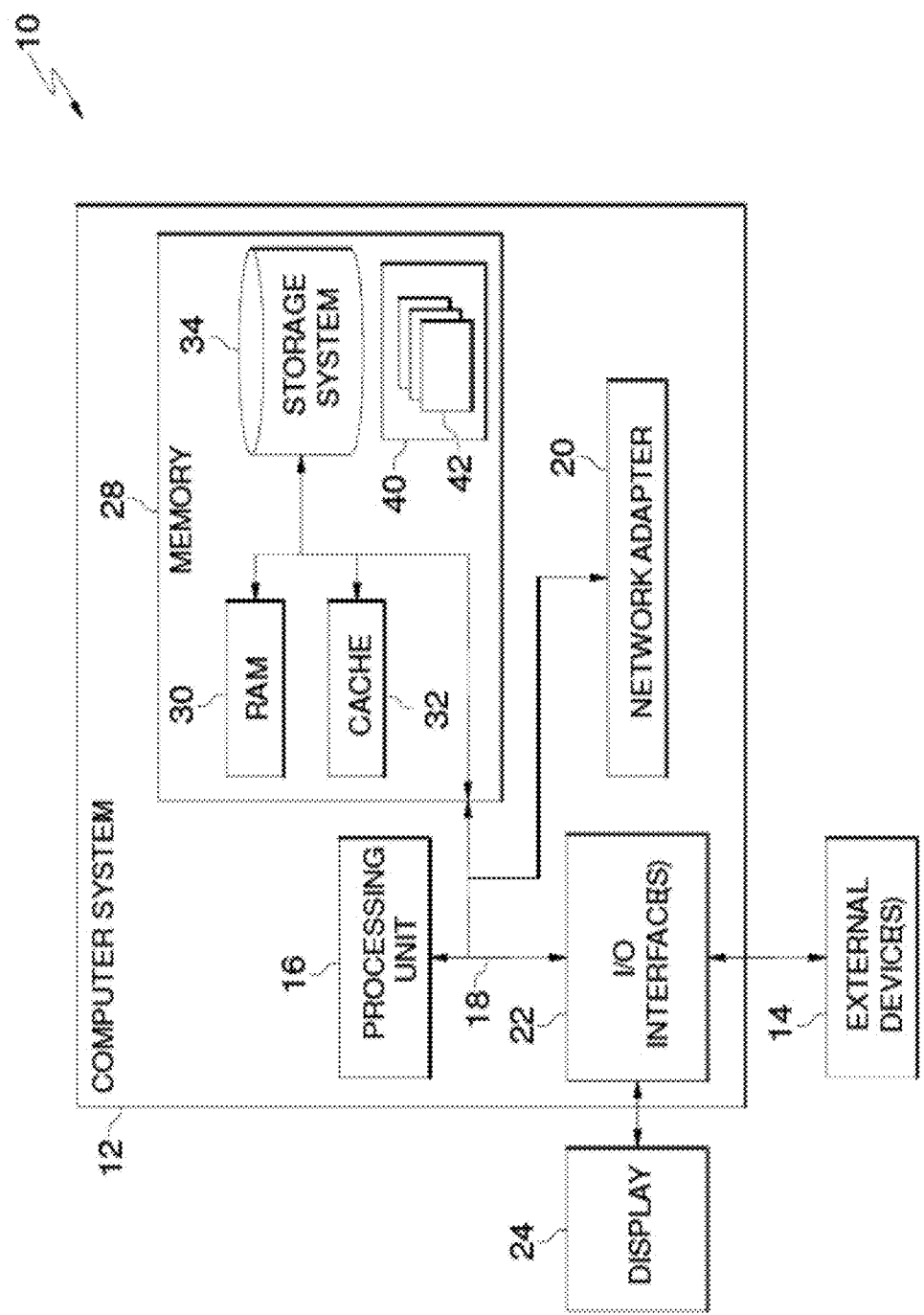
FIG. 1 shows a computer system (10), in accordance with one embodiment, into which the Chinese name matching can be implemented.

The various embodiments described herein pertain to techniques for Chinese name matching, which are capable of matching both Chinese character variants and Romanized variants while significantly reducing the number of false positives that are caused by the many-to-one relationship between Chinese characters and their Romanized forms. In accordance with various embodiments, Chinese names are first Romanized by a Chinese name transliteration algorithm, which is described in co-pending U.S. patent application Ser. No. 13/776,797, entitled "Chinese Name Transliteration", filed on Feb. 26, 2013, and incorporated herein by reference. The Romanized names, which conform to standard Mandarin Pinyin representations, are used directly for cross-language name-matching, just like names that are already in Romanized forms or have been Romanized from other supported scripts (such as Arabic, Cyrillic, etc.). If both the query name and the return name are Chinese characters, a native script comparison is applied. This involves a character-by-character comparison, character variant look-up, and consideration of name component misalignments. The Chinese name matching is used as a filter to reduce false positives that are generated from the Romanized comparison.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a schematic of an example of a Chinese name matching system (10) is shown. It should be noted that the Chinese name matching system (10) is only one example of a suitable Chinese name matching system and is not intended to suggest any limitation as to the scope of use or functionality of embodiments of the invention described herein. It should further be noted that while the examples used herein refer to Chinese name matching, the underlying principles and techniques can be equally well implemented for any other character-based language.

The Chinese name matching system (10) includes a computer system 12, which is operational with numerous other general purpose or special purpose computing system environments or configurations, as described above. The computer system (12) may be described in the general context of computer system executable instructions, such as program modules, being executed by a computer system. The computer system (12) may be practiced in distributed cloud computing environments where tasks are performed by remote processing devices that are linked through a communications network. In a distributed cloud-computing environment, program modules may be located in both local and remote computer system storage media including memory storage devices.

As shown in FIG. 1, the computer system (12) in Chinese name matching system (10) is shown in the form of a general-purpose computing device. The components of the computer system (12) may include, but are not limited to, one or more processors or processing units (16), a system memory (28), and a bus (18) that couples various system components including the system memory (28) to the processor (16).

As will be further depicted and described below, the memory (28) may include at least one program product having a set (e.g., at least one) of program modules that are configured to carry out the functions of embodiments of the invention. A Program/utility (40), having a set of program modules (42), may be stored in the memory (28) by way of example, and not limitation, as well as an operating system, one or more application programs, other program modules, and program data. Each of the operating system, one or more application programs, other program modules, and program data or some combination thereof, may include an implementation of a networking environment. The program modules (42) generally carry out the functions and/or methodologies of embodiments of the invention as described herein.

The computer system (12) may also communicate with one or more external devices (14) such as a keyboard, a pointing device, a display (24), etc.; one or more devices that enable a user to interact with computer system (12); and/or any devices (e.g., network card, modem, etc.) that enable the computer system (12) to communicate with one or more other computing devices. Such communication can occur via the Input/Output (I/O) interfaces (22). Still yet, the computer system (12) can communicate with one or more networks such as a local area network (LAN), a general wide area network (WAN), and/or a public network (e.g., the Internet) via a network adapter (20).

As was described above, several advantages can be accomplished in accordance with the various embodiments of the invention. For example, cross-script name matching is supported; the number of false positive matches seen in Romanized Chinese names due to the many-to-one relationship between Hanzi names and their Romanized forms can be reduced compared to conventional techniques; and matching issues caused by character variations commonly seen in Chinese name representations from different Chinese-speaking regions can be solved.

Figure 2:
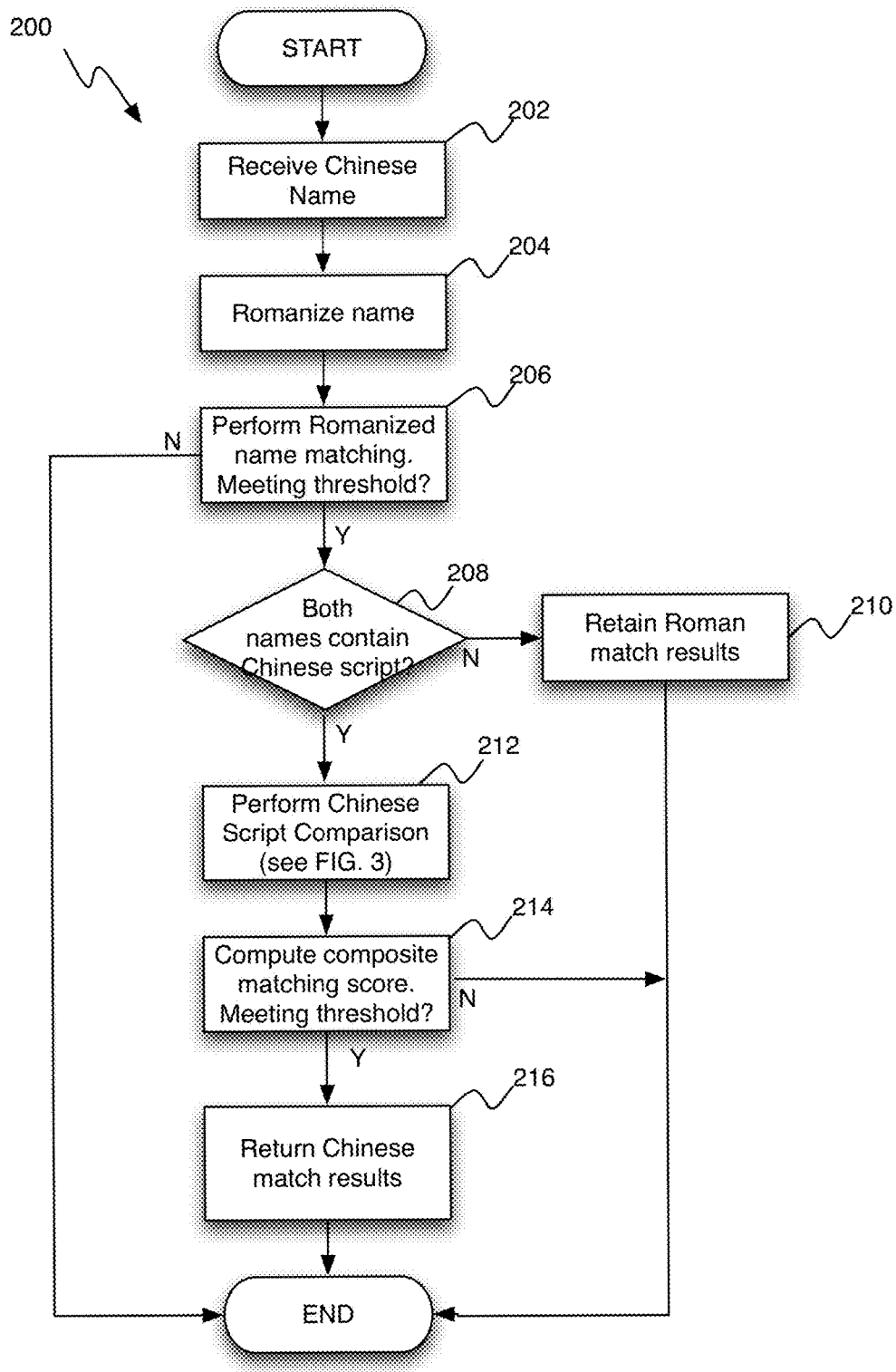
FIG. 2 shows a process (200) for Chinese name matching, in accordance with one embodiment.

FIG. 2 shows a process (200) for performing Chinese name matching, in accordance with one embodiment. As can be seen in FIG. 2, the process starts by receiving a Chinese name (step 202). Next, the name is Romanized using the algorithm described in the co-pending application incorporated by reference above, which is based on a standard Romanization system (step 204). The Romanization is done by parsing the received Chinese name into a surname and a given name, transliterating the identified surname and the identified given name into a Romanized representation and normalizing the Romanized representation of the surname and the given name into a representation in accordance with a standard Romanized Chinese naming convention. The details of each of these steps are described in the co-pending application, but in general terms, the output of the Romanization step 204 is a set of Roman characters that represent the Chinese name and does not include any special characters.

The Romanized version of the Chinese name is then checked against an existing set of Romanized names to detect whether there are any matches in Romanized form (step 206). The Romanized name matching results (which can be thought of as a set of "initial matches") are returned based on whether an obtained matching score meets a pre-defined threshold that can be set by the user. For example, ZHANG DECAI should match CHANG TETSAI at a high matching score because they are the same Romanized name, resulting from two different Romanization systems. Wu and Ng as surnames also obtain a high matching score since they are the same underlying surname with two different pronunciations in two dialects, Mandarin and Cantonese, and therefore are variants of each other. In some embodiments, names that are pronounced similarly are included in the match results. For example, some Chinese dialects have no retroflexion and speakers from those dialects may have difficulty distinguishing between "C" and "CH" in Mandarin. So ZHANG DECAI and ZHANG DECHAI sound very similar and also yield a relatively high score.

If no matches are found in step 206 that meet the threshold value, the process (200) ends. In the event that there are matches that meet the threshold value, it is determined whether both the query and matched names contain the same original script (i.e., the non-Romanized) (step 208). If both names do not contain the same original script, the Romanized name matching results are retained (step 210) and the process ends.

If it is determined in step 208 that both the query and matched names contain the same original script (i.e., the Chinese script), then a native Chinese script comparison is performed (step 212), which will be described in further detail below and with reference to FIG. 3.

The result of step 212 is a matching score indicating to what degree the Chinese characters match. That is, in essence it works as a filter that eliminates false positive matches from the initial Romanized matching of step 206. Once the Chinese character comparison is completed, a composite matching score of the Chinese and Romanized matching indicating the likelihood of a match is computed and compared to a threshold value (step 214). A user may set a minimum threshold value for a matching score below which a name is not considered to be a match. If the matching score is below the threshold, the process (200) ends. Otherwise, the Chinese matching score is returned (step 216). This ends the process (200).

Figure 3:
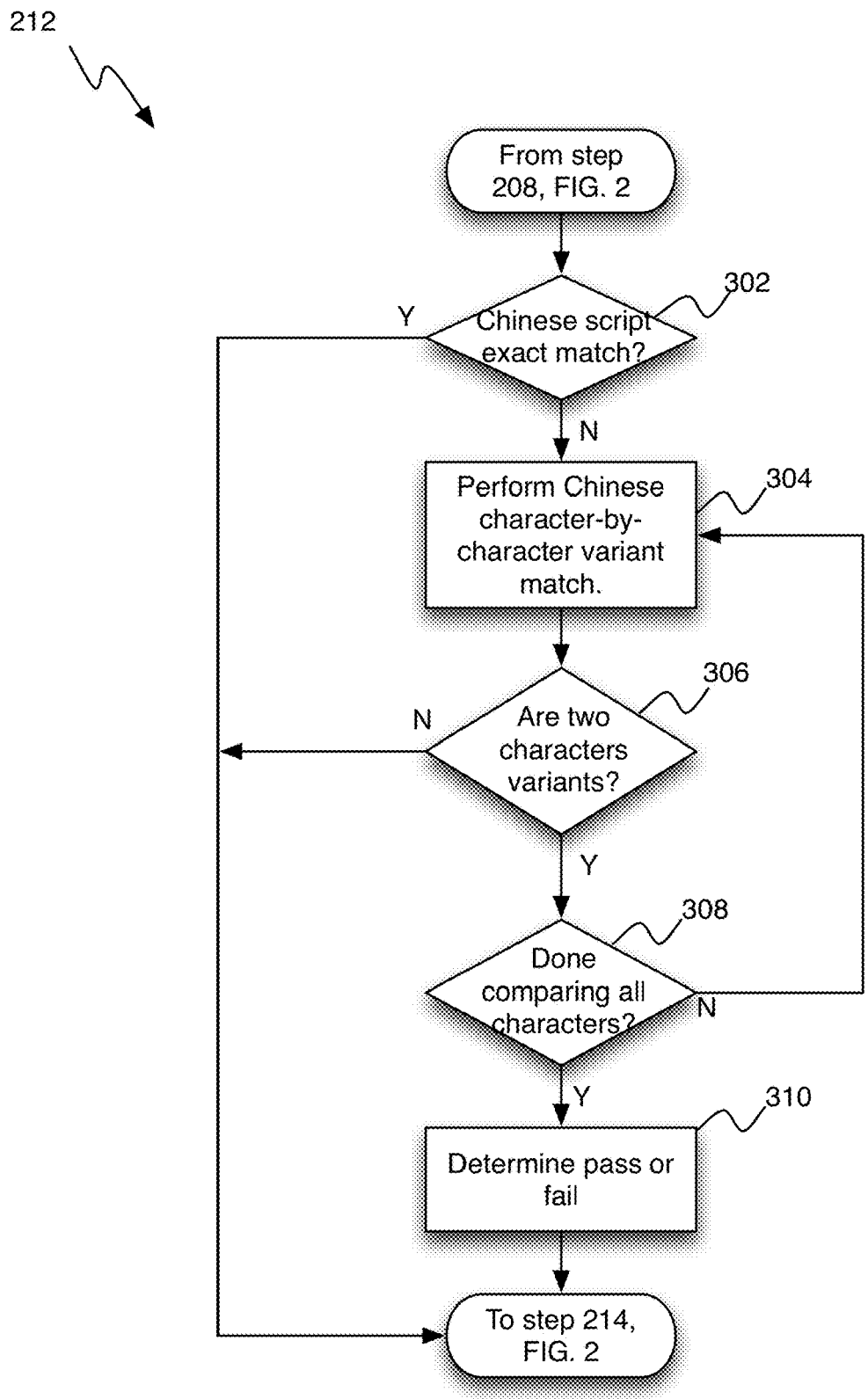
FIG. 3 shows a detailed view of the Chinese character comparison step 212 of FIG. 2, in accordance with one embodiment.

FIG. 3 shows a more detailed view of the native Chinese script comparison step 212. This process is performed when the received Chinese name and the matching Romanized name detected in step 206 has identical scripts, as determined in step 210 of FIG. 2, to further improve the results of the comparison. As can be seen in FIG. 3, the process (212) starts by comparing the received Chinese character with the Chinese character that was found through the Romanization matching step (step 302) to see if there is an exact match. If an exact match is found, a match score of 1.0 is assigned to the pair, and the process ends.

If an exact match is not found, the process tests the two characters for a variant match by comparing character to character using a non-Roman (Chinese) variant table (step 304). Each character in the query name is compared against every character in the match name. A matched variant is given a score indicating how close the match is. The Chinese variant table, in one embodiment, contains pairs of related Chinese characters and associated match scores. Variant pairs include, for example, simplified vs. traditional variants and other variants that are defined in the Unicode data. In some embodiments, the Chinese variant table can be customized, i.e., it is a user-configurable table. The Chinese variant table contains a score for each variant pair that is used to indicate how closely related the pair of characters is. Simplified and traditional character pairs are typically given high scores. It should be noted that in other character-based languages, similar variant tables can be implemented to map one set of characters to another set of variants (e.g., in Japanese) with associated closeness scores.

In one embodiment, a Chinese variant table may contain the following variant pairs and scores:

0.95 财:財 [traditional vs. simplified]
0.80 才:財 [specialized semantic variants]

If a variant match is found, a variant score is calculated and assigned to the match score. For example, for a traditional name vs. a simplified name, this would yield the following match score:

李得財 vs. 李得财 scores 0.98

For names in semantic variants, the following match score would be obtained:

李得才 vs. 李得財 scores 0.93

If no variant match is found, a match score of zero is obtained. No further comparisons are made and the name is not returned with the match results, of step 212.

If a query name contains several characters, steps 304 and 306 are performed for each character of the name until it is determined that all characters have been compared (step 308). Finally, it is determined whether the variant match score is sufficient to be returned in the initial search match results (step 310). If the match score is sufficient, it will be used to compute a composite matching score, as described above with respect to step 214.

It should be noted that in the case with several characters, the individual match scores can be added and averaged to create a match score for the entire group of characters to yield a final Chinese name matching score. It should further be noted that this is merely one example and that there are many ways in which match scores can be created for groups of characters by those of ordinary skill in the art. In some embodiments, if all characters match but are in a different order, a penalty is applied to the name matching score.

Thus, as stated earlier, the Chinese name match score calculated in step 214 can be used as a "filter" to discard matches found from the initial Romanized name matching. This aids in alleviating the problem of "false positives" that is caused by the many-to-one relationship between Chinese characters and their Romanized form.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product for Chinese name matching, the computer program product comprising a computer readable storage medium having program code embodied therewith, wherein the computer readable storage medium is not a transitory signal per se, the program code being executable by a processor to perform a method comprising:

romanizing, by a Chinese name transliterator, a received Chinese personal name consisting of one or more characters representing a Chinese surname followed by one or more characters representing a Chinese given name into a single Mandarin Pinyin representation, wherein the Chinese name transliterator includes a transliteration module, a name parsing module, and a normalization module, and wherein the romanizing includes:

parsing, by the name parsing module, the Chinese personal name into a Chinese surname and a Chinese given name by:

first, identifying any dual-character Chinese surnames in the received sequence of characters, by referencing a list of known Chinese surnames, second, identifying any single-character Chinese surnames in the received sequence of characters, by referencing the list of known Chinese surnames, and third, identifying, all remaining characters not belonging to a dual-character or a single-character Chinese surname in the received sequence of characters as a given name, wherein identifying dual-character and single-character Chinese surnames is done in a left-to-right order;

transliterating, by the transliteration module, the identified Chinese surname and the identified Chinese given name into a Mandarin Pinyin representation, wherein different transliteration methods are used depending on whether a pronunciation of a character is sensitive to a name field in which the character occurs, or whether the pronunciation of the character is not sensitive to the name field; and normalizing, by the normalization module, the identified Chinese surname and the identified Chinese given name into a Mandarin Pinyin representation;

searching by the processor, in a database containing a database table of Romanized Chinese personal names, for a potential match between the Mandarin Pinyin representation of the Chinese personal name and a Romanized Chinese personal name, wherein the Romanized Chinese personal names in the database table originate from a plurality of different Chinese character names;

in response to finding a potential match between the Mandarin Pinyin representation and a Romanized Chinese personal name, retrieving, by the processor, from the database table, the original Chinese script used to generate the Romanized Chinese personal name; and applying, by the processor, a native script comparison between the received Chinese personal name and the original Chinese script for the Romanized Chinese personal name as a filter to reduce false positives generated in the matching of the Mandarin Pinyin representation of the Chinese personal name against the Romanized Chinese personal names, wherein the native script comparison is done using a Chinese character variant database table containing pairs of characters and a match score for each character pair.

2. The computer program product of claim 1, wherein the native script comparison further includes one or more of: character-by-character comparison, and consideration of name component misalignments.

3. The computer program product of claim 1, wherein applying the native script comparison is performed only when the received Chinese personal name and the original Chinese script for the Romanized Chinese personal name are the same script.

4. The computer program product of claim 1, wherein the method further comprises:
adjusting the match score, based on consideration of name component misalignments.

5. A system for Chinese name matching, comprising:
a Chinese name transliterator including a transliteration module, a name parsing module, and a normalization module;
a processor;
a memory containing instructions that are executable by the processor for causing the processor to perform the following operations:
receiving, by a processor, an electronic representation of a Chinese personal name;
romanizing, by the Chinese name transliterator, a received Chinese personal name consisting of one or more characters representing a Chinese surname followed by one or more characters representing a Chinese given name into a single Mandarin Pinyin representation wherein the romanizing includes:
parsing, by the name parsing module, the Chinese personal name into a Chinese surname and a Chinese given name by:
first, identifying any dual-character Chinese surnames in the received sequence of characters, by referencing a list of known Chinese surnames, second, identifying any single-character Chinese surnames in the received sequence of characters, by referencing the list of known Chinese surnames, and third, identifying, all remaining characters not belonging to a dual-character or a single-character Chinese surname in the received sequence of characters as a given name, wherein identifying dual-character and single-character Chinese surnames is done in a left-to-right order;

transliterating, by the transliteration module, the identified Chinese surname and the identified Chinese given name into a Mandarin Pinyin representation, wherein different transliteration methods are used depending on whether a pronunciation of a character is sensitive to a name field in which the character occurs, or whether the pronunciation of the character is not sensitive to the name field; and normalizing, by the normalization module, the identified Chinese surname and the identified Chinese given name into a Mandarin Pinyin representation;

searching by the processor, in a database containing a database table of Romanized Chinese personal names, for a potential match between the Mandarin Pinyin representation of the Chinese personal name and a Romanized Chinese personal name, wherein the Romanized Chinese personal names in the database table originate from a plurality of different Chinese character names;

in response to finding a potential match between the Mandarin Pinyin representation and a Romanized Chinese personal name, retrieving, by the processor, from the database table, the original Chinese script used to generate the Romanized Chinese personal name; and applying, by the processor, a native script comparison between the received Chinese personal name and the original Chinese script for the Romanized Chinese personal name as a filter to reduce false positives generated in the matching of the Mandarin Pinyin representation of the Chinese personal name against the Romanized Chinese personal names, wherein the native script comparison is done using a Chinese character variant database table containing pairs of characters and a match score for each character pair.

6. The system of claim 5, wherein the native script comparison further includes one or more of: character-by-character comparison, and consideration of name component misalignments.

7. The system of claim 5, wherein applying the native script comparison is performed only when the received Chinese personal name and the original Chinese script for the Romanized Chinese personal name are the same script.

8. The system of claim 5, further comprising:
adjusting the match score, based on consideration of name component misalignments.

* * * * *